April 12, 1938. J. H. LARMUTH 2,113,698
MEANS FOR AUTOMATICALLY STOPPING, STRANDING,
CABLING, AND ROPE MAKING MACHINES
Filed April 12, 1937 4 Sheets-Sheet 1
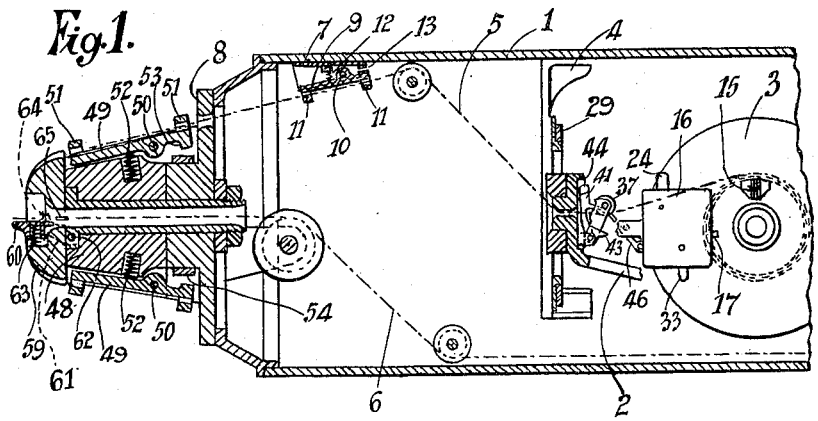
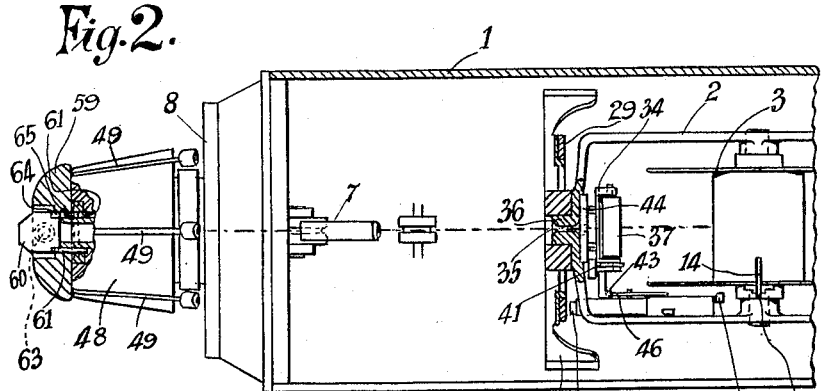
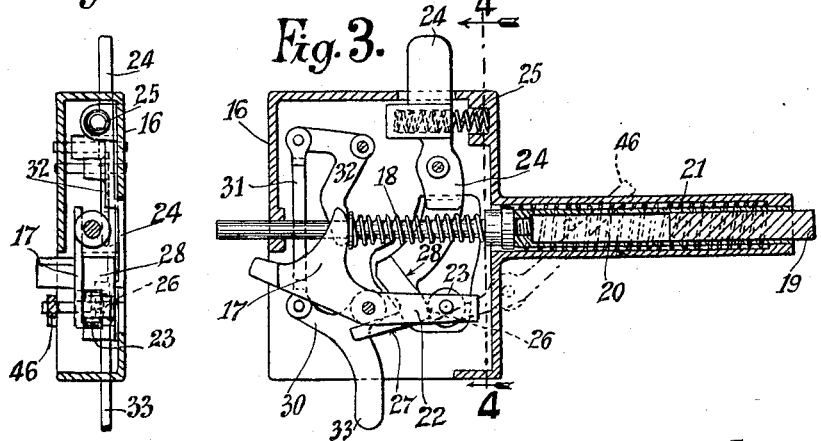
Inventor.
John Hamilton Larmuth.
per Ferdinand Broster Bonhardt
Attorney.

April 12, 1938.    J. H. LARMUTH    2,113,698
MEANS FOR AUTOMATICALLY STOPPING, STRANDING,
CABLING, AND ROPE MAKING MACHINES
Filed April 12, 1937    4 Sheets-Sheet 2
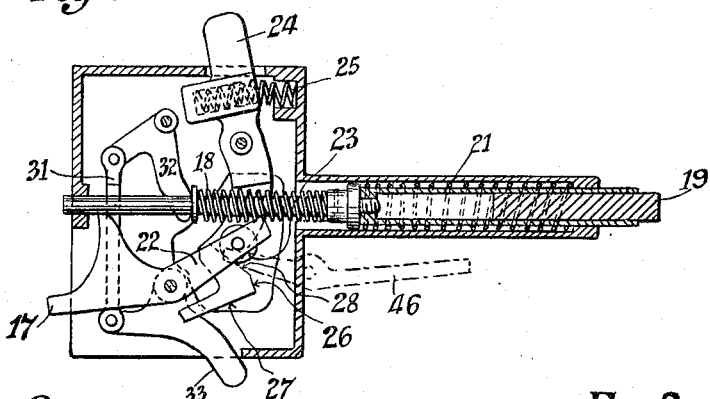
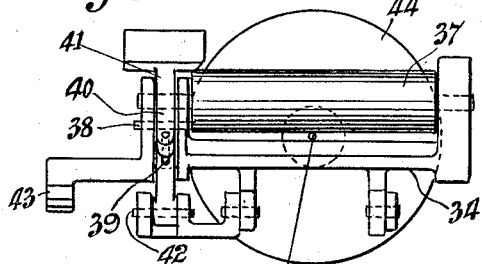
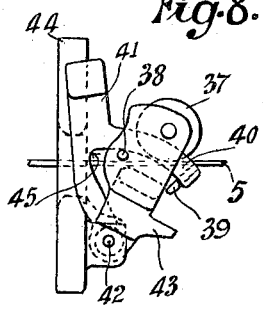
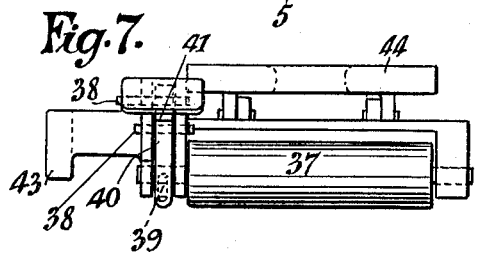
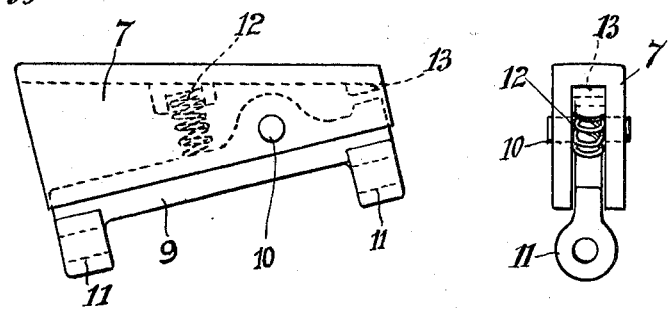
Inventor.
John Hamilton Larmuth.
per Ferdinand Broster Bosshardt
Attorney.

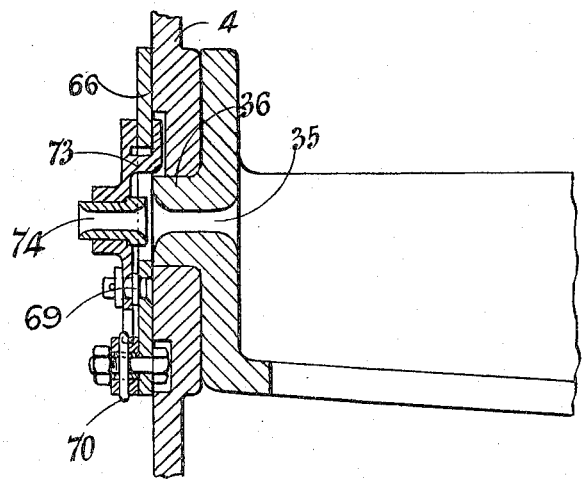
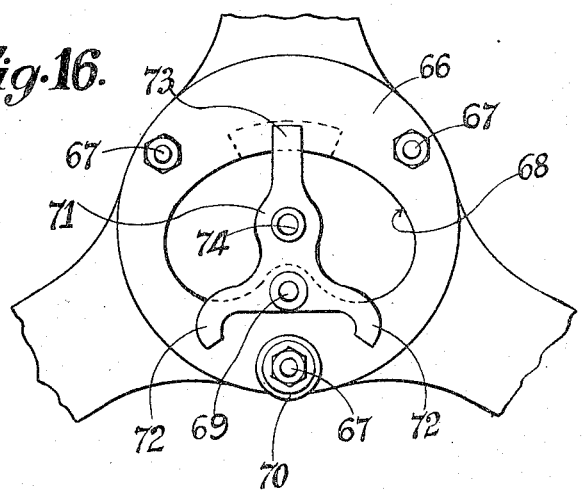

Patented Apr. 12, 1938

2,113,698

UNITED STATES PATENT OFFICE 2,113,698

MEANS FOR AUTOMATICALLY STOPPING STRANDING, CABLING, AND ROPE MAKING MACHINES

John Hamilton Larmuth, Hill Crest, Upper Colwyn Bay, North Wales

Application April 12, 1937, Serial No. 136,417
In Great Britain April 22, 1936

13 Claims. (Cl. 117—51)

This invention relates to means for automatically stopping stranding, cabling and rope making machines and has for its object to enable electricity to be employed as the motive power for stopping the machine either on breakage of a wire, strand or thread or just before a bobbin becomes exhausted of wire, strand or thread or both on the said breakage and the approaching exhaustion of the wire, strand or thread.

According to my invention I provide on each bobbin cradle, a roller mounted in a swing bracket and adapted to support the bracket by resting on the wire, strand or thread near the place where the same travels through the eye of the said cradle, the said roller being adapted to act on a lever which controls an electric contact adapted to cooperate with a contact on the cradle support when the lever is acted on by the said bracket.

Furthermore there may be provided on each cradle an oscillatable lever adapted for actuation by impingement thereon of a movable member controlled by the material on the bobbin, the said lever operating the said electric contact and being locked in the operative position by a hand-releasable catch.

The said catch preferably not only locks the said lever but also continues the actuation of the lever commenced by the said impingement until the lever attains a position where the said movable member can no longer act thereon.

The said lever is arranged for actuation also by the said swing bracket.

There may also be provided an arm mounted on the front bearing of each bobbin cradle bearing to swing on an axis eccentric to but parallel with the axis of rotation of the machine, the said arm being provided with an eye or slot through which the wire, thread or strand passes after leaving the cradle eye and being adapted to close an electric circuit when released by failure of the wire, thread or strand to restrain movement thereof about the first named axis.

The arm is preferably adapted to close the said electric circuit in two different end positions and be retained by the tension of the wire, thread or strand in an intermediate position.

The arm is preferably partially counter-balanced against the action of inertia or centrifugal action, whereby the effect of only a fraction of the said action has to be sustained by the wire, thread or strand.

The preferred method of producing closure of an electric circuit is to form the arm as part of the said circuit and provide on the said arm contact surfaces adapted to contact with a single contact or with two contacts when the arm is in its end positions.

The arm may be mounted on a plate adapted to be attached to the end of the bearing or direct on the end of the bearing.

Guide means is preferably provided on the arm and plate or arm and bracket to guide the arm in the direction of its swing.

The guide means may comprise a fork on the arm engaging the rim of an aperture and/or a bar connected to a surface and constraining the arm to movement in a space between the bar and the said surface.

The eye or slot in the arm is either in alignment with the cradle eye or oblique thereto, according to whether the arm is arranged in front of the front cradle or in front of one of the rear cradles.

This device is extremely simple and very compact and is usable for all of the wires, threads or strands acted on by the machine and, whilst not interfering with or hindering easy threading of the wires, threads or strands through the machine subjects them to a minimum of rubbing or strain, and is very quick and certain in action.

A lever for and controlled by each wire, strand or thread may be provided on the nose of the machine to react to stop the machine on breakage of the wire, strand or thread after it has passed through the lay plate.

A lever for and controlled by the core wire, strand or thread, if any, may be provided on the nose of the machine to react to stop the machine on breakage of the said core wire, strand or thread in or in the vicinity of the said nose.

The hereinbefore stated devices not only stop the machine before exhaustion of any of the bobbins, but also on any breakage occurring at any point up to the twisting point.

I attain the hereinbefore stated object by the mechanism hereinafter claimed and described with reference to the accompanying drawings, wherein—

Figure 1 is a fragmentary side view in section of a portion of a stranding, cabling and rope making machine.

Figure 2 is a fragmentary plan view in section thereof.

Figure 3 is a detached side view in section of one of the devices.

Figure 4 is a detached front view in section taken on a line corresponding with line 4—4 of Figure 3.

Figure 5 is a similar view to Figure 3, but with the parts in different positions.

Figure 6 is a detached rear view of another of the said devices.

Figure 7 is a plan view thereof, and

Figure 8 a side view.

Figure 9 is a detached side view, and Figure 10 a front view of still another of the said devices.

Figure 11:
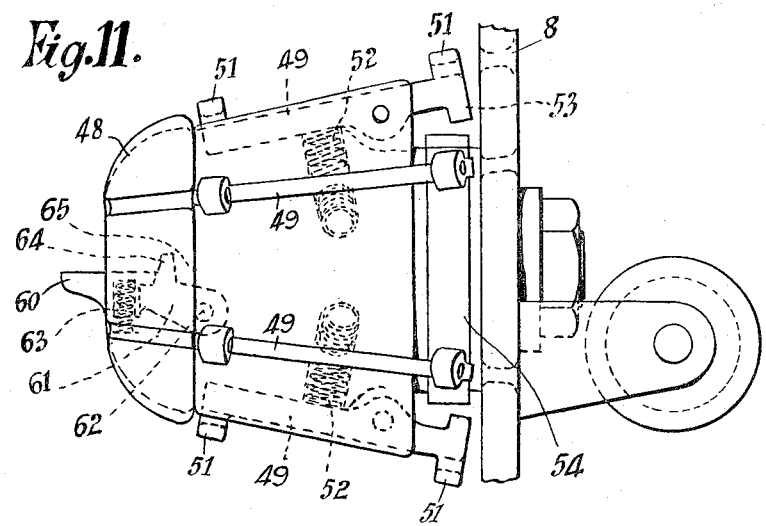

Figure 11 is a detached side view of the nose of the machines provided with two others of the said devices.

Figure 12:
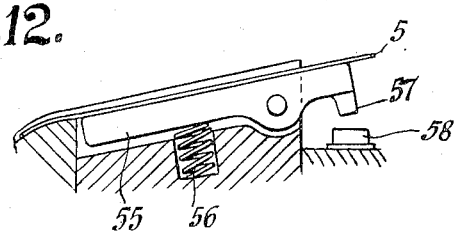

Figure 12 is a detached side view illustrating a modification of one of the devices shown in Figures 1, 10 and 11.

Figure 13:
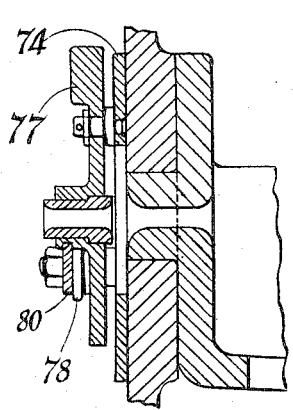

Figure 13 is a fragmentary side view in section illustrating an alternative device which can be substituted for the device shown more particularly in Figures 6 to 8.

Figure 14:
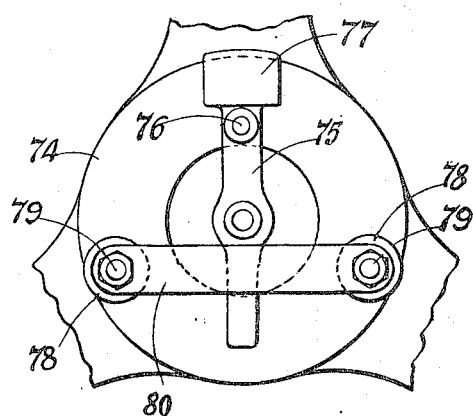

Figure 14 is a fragmentary front view of the said alternative alternative device.

Figure 15 is a fragmentary side view in section showing another alternative device which can be substituted for the device shown more particularly in Figures 6 to 8.

Figure 16 is a front view of said alternative device.

Figures 4 to 16 are drawn to a larger scale.

Referring to the drawings, the construction shown therein is applied by way of example to a wire or thread stranding machine comprising a plurality of cradles carrying the bobbins of material to be stranded and mounted in brackets carried by a rotary tube having a lay plate at the front. Figures 1 and 2 show only the front portion of the rotating tube 1 and a portion of one cradle 2 and bobbin 3, one bracket 4, and two wires or threads 5 and 6 respectively. It is to be understood however that there are further similar cradles, bobbins and brackets arranged one behind the other in the tube 1 and further wires similar to the wire 5 coming from the said further bobbins and each provided with the devices hereinafter described in connection therewith. Referring to Figures 1, 2, 9 and 10, I provide at the front of the tube 1 a bracket 7 for and in the path of the wire 5 and each similar wire which converges on to the lay plate 8. The bracket 7 is fixed inside the front of the tube 1 and carries a lever 9, one for each of the said wires or threads. The lever 9 has two perforated lugs 11 arranged in alignment for the wire 5 to travel through on its way to the lay plate 8, the wire when in the taut state acting on the lugs 11 to hold the lever 9 in an inoperative position. When the wire 5 becomes slack for example through breakage or exhaustion and therefore no longer holds the lever 9 in the said position the lever 9 makes a movement into the operative position. The said movement may be caused by centrifugal effect produced by arranging the fulcrum pin 10 so that the lever arms are of unequal length and/or by means of a compression spring 12 provided between the lever 9 and the bracket 7. Because the wire 5 passes through the two lugs 11 on the lever 9 the centrifugal effect and/or spring pressure acting on the wire 5 through the said lever and lugs is distributed to two different places on the wire 5 and therefore the strain on the wire 5 at any one place is halved and consequently possibility of breakage of or injury to the wire 5 by the said lugs is minimized. Therefore the device can be employed for use where the wire is weak or delicate without danger of breakage of the same. The lever may be caused to make electric contact when in the operative position by providing on the bracket an electric contact 13 for the lever 9, the contact being insulated from the bracket 7. The lever 9 and all similar levers are in electric connection with the tube 1 which is in electric connection with the machine frame.

To avoid the loss of the end of a wire or thread from its bobbin such as might occur if the hereinbefore described device were relied on solely to stop the machine automatically, I provide the bobbin 3 and similar bobbins each with a feeler 14, Figures 1 and 2, of any suitable kind to become displaced when the wire or thread on the bobbin has been reduced to a predetermined number of coils and thereby bring a striking part 15 which is on the feeler 14 and rotates with the bobbin into operative position.

A box 16 is mounted on the cradle 2, Figures 1 to 5, and each other cradle and contains an angle lever 17 pivotally mounted in the box and having one arm extending through a slot in the box to the exterior thereof where it can be struck by the striking part 15 when the latter is in its operative position. The lever 17 acts through a compression spring 18, Figures 3 to 5 on a contact 19 provided on a rod 20 which is slidably mounted in the box 16 and projects outside the same. A compression spring 21 is provided between the box 16 and the rod 20 to maintain the contact 19 in the withdrawn position. The lever 17 is provided with an extension 22 which has a lug roller 23 cooperating with a hand-operable locking lever 24 acted on by a compression spring 25 arranged in the box 16. The locking lever 24 has a surface 26 whereby it is supported in a non-locking state by the roller 23 when the angle lever 17 is in the normal position shown in Figures 1, 3 and 4. The locking lever 24 also has a slanting surface 27 which acts on the roller 23 under the motive power of the named spring 25 to produce a continuation of the movement of the angle lever 17 after it has been commenced by the striking part 15 and caused the roller 23 to remove its support from the named surface 26 and thereby free the locking lever 24. A surface 28 is also provided on the locking lever 24 to operate similarly on the roller 23, but thereby cause the lever 17 to move in the reverse direction when movement in the said reverse direction has been initiated by the striking part 15, due to rotation of the bobbin in the reverse direction.

The front bracket 4 in which the cradle 2 is mounted is provided with a contact ring 29, see Figures 1 and 2, which faces the contact surface 19, and is insulated from the bracket 4. On actuation of the angle lever 17 by the striking part 15, due to the wire or thread on the bobbin 3 having been reduced to the predetermined number of coils, the lever 17 oscillates and releases the locking lever 24, the slanting surface 27 of which continues the movement of the angle lever 17 in the same direction until the projecting arm of the lever 17 is out of the path of the striking part 15 and therefore cannot be struck repeatedly thereby, the slanting surface 27 then keeping the lever 17 locked in the new position. The oscillation of the angle lever 17 acts through the compression spring 18 and rod 20 to push the contact surface 19 against the contact ring 29 and absorbs any surplus motion of the lever 17 beyond that necessary to produce a light but certain contact of the surface 19 with the ring 29. On moving the locking lever 24 by hand from its locking position the compression spring 21 acts to again withdraw the contact surface 19 from the contact ring 29 and also acts on the lever 17 to return it to its normal position where it again supports the locking lever 24 in a non-locking state.

In order to cause the lever 17 to project the contact 19 when the lever 17 is moved in the reverse direction, the lever 17 is attached to a lever 30 which is connected by a connecting rod 31 to a lever 32 which is also adapted to act on the rod 20. Movement of the lever 17 in the said reverse direction causes the same to recede, see Figure 5, but causes the lever to advance and thus projects the contact 19. The lever 30 has a part 33 which projects through a slot in the box 16 and can be used as an aid to the re-setting of the parts of the device into the normal position.

The hereinbefore described device is thus adapted to make electric contact, irrespective of whether the lever is struck by the striking part 15 from one direction or the reverse direction.

In addition to the first described device, there may be provided on the cradle 2 and each similar cradle a vertically swingable bracket 34, Figures 1, 2, 6, 7 and 8, mounted on a ring 44 attached to the inner side of the cradle 2 to surround the orifice 35 of the hollow trunnion 36 of the cradle 2 through which the wire or thread passes immediately after leaving the bobbin 3 mounted in the cradle. The bracket 34 carries a horizontal roller 37 which rides on the wire 5 and is thereby prevented from swinging by gravity downwards with the bracket 34. The bracket is provided with a horizontal pin 38 adapted to act on a pin 39 provided on an arm 40 of a weighted lever 41 fulcrumed at 42. The lever 41 has a striking surface 45 adapted to strike the pin 38. In operation, the lever leans loosely against the inner side of the cradle, in the position shown in the drawings, and so long as the wire or thread is normally taut where it passes from the bobbin to the trunnion 36, the roller 37 and bracket 34 are supported by it, but if the wire or thread breaks or becomes slack due to its last coils leaving the bobbin, the roller 37 and bracket 34 fall and the pin 38 on the latter strikes the pin 39, thereby causing the lever 41 to move in the same direction as the bracket 34. On the box 16, there is a lever 46 which acts on a pin 47 provided on the lever 17. As the bracket 34 falls, the lug 43 strikes the lever 46 and thus displaces the lever 17. The striking surface 45 of the also falling lever 41 strikes the pin 38 and this impact ensures that the bracket 34 displaces the lever 17 sufficiently to enable the surface 23 to come into action and complete the displacement of the lever 17 into the position shown in Figure 5. The contact 19 is thus projected and thereby makes electric contact. On returning the roller 37 and bracket 34 to the normal position the lever 41 is also returned to the leaning position shown in the figures. The electric contact is broken again by returning the lever 17 to the normal position.

Where the machine is provided with a nose 48, the same may have slots in its periphery of equal number to the wire 5 and similar wires passing through the lay plate 8. Each slot has a lever 49, Figures 1, 2 and 11 pivotally mounted at 50 in it and the lever is provided with perforated lugs 51 through which the wire runs as it passes over the nose 48. The lever 49 is acted on by a compression spring 52 which acts to cause a contact 53 on the lever 49 to contact with a ring contact 54 provided on a reduced part of the nose 48. The ring contact is insulated from the nose 48. The lever 49 is also electrically connected by virtue of its electrical contact with the nose which is in electrical contact with the tube 1. So long as the wire 5 is stretched along the nose, the said wire 49 maintains the lever 49 in the shown, inoperative position, but on slackening of the wire, due to breakage or other causes, it no longer holds the lever which then swings into a position where its contact 53 makes contact with the ring 54.

Figure 12 shows a modified arrangement in which the slot in the nose contains a lever 55 the upper surface of which lies inside the slot and serves for the wire to ride on. This lever is acted on by a spring 56 and has a contact 57 adapted to contact with a ring contact 58. Its operation is similar to that described with reference to the lever 49.

Figures 1 and 2 show the tip 59 of the nose 48 provided with a plate 60 having lugs 61 whereby it is pivotally mounted at 62 to the tip 59. A compression spring 63 may be provided to act on the pivotal plate 60 to cause it to swing into a position where a contact 64 provided on the pivotal plate contacts with an insulated contact 65 provided on the tip 59. The core wire 6 passing through the tip, so long as it is in the desired taut state keeps the plate 60 against the action of the spring 63 in a position where the contact 64 is out of contact with the contact 65, but if the core wire 6 slackens due to breakage or another reason, it no longer restrains the plate and the said plate is then swung by centrifugal effect and the spring 63 into a position where the contact 64 touches the contact 65. The plate 60 and contact 64 are in electric contact with the tip which is in electric connection with the tube.

The construction illustrated in Figures 15 and 16 may be employed instead of the device described with reference to Figures 1, 2, 6, 7 and 8. In this construction I mount on the front vertical face of the front bracket 4 and each further front bracket, a disc 66 secured to the bearing by means of three screws 67. The disc 66 is provided with an aperture 68, which may be kidney-shaped and exposes the eye 35 of the said front trunnion 36. The disc 66 is provided with a pivot 69 which projects from the front face thereof and is parallel with the axis of the trunnion eye 35, but eccentric to the said axis. One of the three screws 67 is situated nearer to the said pivot than the other two. This screw 67 serves to also carry an electric contact in the form of an eye 70 insulated from the screw but presenting a bare or conductive external periphery.

An arm 71 is mounted on the pivot 69 to extend across the disc aperture 68 and swing in a plane at right angles to the trunnion axis and therefore parallel with the face of the disc 66. The arm 71 is counter-balanced to any required extent by the provision thereon of two horns 72, one of which is adapted to make contact with the contact eye 70 in and determine the one end position of the arm 71 and the other of which is adapted to make contact with the contact eye 70 in and determine the other end position of the arm 71, the contact eye 70 acting as a stop against which the horns 72 abut in the end positions of the arm 71.

The end of the arm 71 is provided with a fork 73 engaged by the rim of the aperture 68 of the disc 66, the part of the rim engaged thereby being of arcuate form struck from the centre of the pivot 69. The arm is electrically connected to the disc and provided with an eye 74 through which the wire, thread or strand travels after leaving the trunnion eye 35. The eye 74 is so positioned and directed that when the wire, thread or strand is intact and still connected to the bobbin, the said wire, thread or strand by virtue of its engagement with the eye 74 retains the arm 71 against inertia or centrifugal effect in a medial position where neither of the horns 72 is in contact with the contact eye 70.

In operation, so long as the wire, thread or strand is in tension and therefore unbroken or unexhausted the arm 71 is held in the medial position thereby, but immediately breakage or exhaustion occurs, the arm 71 swings over, due to its inertia or centrifugal effect thereon, into one or other of its two-end positions, according to the direction of rotation of the machine, where it makes electric contact with the contact eye 70.

The eye 74 for the front wire, thread or strand is coaxial with the trunnion eye 35, whilst those for the remaining wires, threads or strands are oblique, the discs being displaced circularly so that each eye 74 shall coincide with the particular normal path which each of the said wires, threads or strands takes after leaving the trunnion eye 35.

In the second alternative construction shown in Figures 13 and 14, for use instead of the device shown more particularly in Figures 6 to 8, a disc 74 mounted on the front bracket 4 and each other similar front bracket has an arm 75 pivotally mounted on it at 76. The arm has a part 77 intended for partial counterbalancing purposes only, and a contact eye 78 is provided on each of two screws 79. The contact eyes 78 are insulated from the screws 79. They are arranged to be impinged against by the end of the arm 75 so as to determine the two end positions thereof and establish contact with the arm 75 in the said end positions. A guard or guide bar 80 may be provided to extend from one of the said two screws 79 to the other to prevent the said end from being dragged forwards whilst leaving the arm 75 free to swing in either direction from its medial position.

Instead of the hereinbefore described parts being provided on a disc they may be provided direct on the end of the bracket 4.

I claim:

1. Means for automatically stopping stranding, cabling and rope making machines having a bobbin which carries the material and is mounted in a cradle which has an eye for the material to pass through and is carried by two cradle supports, comprising in combination, a pivotal feeler arm provided on and projecting in axial direction from the bobbin, a swing bracket provided on the cradle for support by the material passing through the said eye, an annular electric contact provided on one of the cradle supports, a movable electric contact provided on the cradle for contacting with the annular contact, a lever provided on the cradle in the path of the said feeler arm for moving the movable electric contact into contact with the annular contact, a second lever provided on the cradle in the path of the swing bracket for actuating the first named lever, and means on the cradle operating on the first named lever for yieldingly locking the first named lever.

2. Means for automatically stopping stranding, cabling and rope making machines having a bobbin which carries the material and is mounted in a cradle which has an eye for the material to pass through and is carried by two cradle supports, comprising the combination of a swing bracket provided on the cradle and supported by the material before it passes through the said eye and a pivotal feeler arm on the bobbin controlled by the material on the bobbin with an electric contact on one of the supports and a cooperating, projectable electric contact on the cradle for operation by both the said bracket and the said feeler.

3. Electric means for automatically stopping stranding, cabling and rope making machines having a bobbin which carries the material and is mounted in a cradle which has an eye for the material to pass through and is carried by two cradle supports, comprising the combination of a movable electric contact on the cradle, movable feeler means on the bobbin for operating the said electric contact on near exhaustion of the material on the bobbin, and weight means on the cradle for also operating the said electric contact separately from the first named means on breakage of the material.

4. Electric means for automatically stopping stranding, cabling and rope making machines having a bobbin which carries the material and is mounted in a cradle which has an eye for the material to pass through, comprising a movable electric contact on the cradle, a swing bracket provided on the cradle near the said eye and held in one position by the material against swinging into a second position, means on the bracket for initiating movement of the electric contact by the fall of the bracket into the said second position, a weighted lever, a support for supporting the weighted lever against movement from one position to another, means on the bracket and weighted lever for moving the weighted lever out of its supported position after the bracket has left its first mentioned position, and means on the weighted lever and bracket for delivering a blow by the said lever to the bracket whilst the said lever is moving into its second position but before the bracket has reached its second position.

5. Electric means for automatically stopping stranding, cabling and rope making machines having a bobbin which carries the material and is mounted in a cradle which has an eye for the material to pass through, comprising a box provided on the cradle, an electric contact slidably mounted on the box, a lever fulcrumed to the box, means on the lever projecting from the box, means on the lever and electric contact for projecting the electric contact by movement of the lever, a spring-loaded lever fulcrumed to the box, riding and locking surfaces provided on the spring-loaded lever, a roller on the first named lever riding on the said riding and locking surfaces, one of the said surfaces locking the first named lever in a medial position, another of the said surfaces moving the lever in one direction into one end position and locking it in the said end position, and still another of the said surfaces moving the lever in the reverse direction into another end position and locking it in the second named end position, and means on the bobbin and cradle for initiating movement of the first named lever out of its medial position when the material on the bobbin is nearly exhausted and when the material being drawn from the bobbin breaks.

6. Means for automatically stopping stranding, cabling and rope making machines having an axis of rotation, comprising a bobbin carrying the material, a cradle in which the bobbin is mounted, a front bearing carrying the cradle, an arm mounted on the front bearing and swinging on an axis eccentric to but parallel with the said axis of rotation, a passage in the said arm through which the material passes after leaving the cradle and means on the said arm for making electric contact when the arm is released by failure of the material to restrain movement thereof about the first named axis.

7. Means for automatically stopping stranding, cabling and rope making machines having an axis of rotation, comprising a bobbin carrying the material, a cradle in which the bobbin is mounted, a front bearing carrying the cradle, an arm mounted on the front bearing and swinging on an axis eccentric to but parallel with the said axis of rotation, a passage in the said arm through which the material passes after leaving the cradle, and means on the said arm for making electric contact in both of two end positions.

8. Means for automatically stopping stranding, cabling and rope making machines having an axis of rotation, comprising a bobbin carrying the material, a cradle in which the bobbin is mounted, a front bearing carrying the cradle, an arm mounted on the front bearing and swinging on an axis eccentric to but parallel with the said axis of rotation, a passage in the said arm through which the material passes after leaving the cradle, means on the said arm for making electric contact when released by the material, and means on the said arm for partially counter-balancing it against the action of inertia and centrifugal action.

9. Means for automatically stopping stranding, cabling and rope making machines having an axis of rotation, comprising a bobbin carrying the material, a cradle in which the bobbin is mounted, a front bearing carrying the cradle, an electrically conductive arm mounted on the front bearing and swinging on an axis eccentric to but parallel with the said axis of rotation, a passage in the said arm through which the material passes after leaving the cradle, and an electric contact provided on said front bearing for being contacted with by the said arm.

10. Means for automatically stopping stranding, cabling and rope making machines having an axis of rotation, comprising a bobbin carrying the material, a cradle in which the bobbin is mounted, a front bearing carrying the cradle, a plate mounted on the said bearing, an arm mounted on the said plate and swinging on an axis eccentric to but parallel with the said axis, guide means on the said arm and plate for guiding the said arm in its swing, a passage in the said arm through which the material passes and means on the said arm for making electric contact when released by failure of the material to restrain movement thereof about the first named axis.

11. Means for automatically stopping stranding, cabling and rope making machines having an axis of rotation, comprising a bobbin carrying the material, a cradle in which the bobbin is mounted, a front bearing carrying the cradle, an arm mounted on the front bearing and swinging on an axis eccentric to but parallel with the said axis of rotation, a passage in the arm the direction of which corresponds with the normal direction of travel of the material away from the cradle, and electric contact means on the said arm for making electric contact when the arm is released by failure of the material to restrain movement thereof about the first named axis.

12. Means for automatically stopping stranding, cabling and rope making machines having a lay plate through which pieces of the material pass and a nose along which the said pieces of material travel, comprising a lever provided on the said nose for and controlled by each piece of material, and an electric contact on each lever for making electric contact on breakage of the material after it has passed through the lay plate.

13. Means for automatically stopping stranding, cabling and rope making machines having a nose through which core material passes, comprising a lever provided on the said nose and controlled by the core material, and an electric contact on the lever for making electric contact on breakage of the core material in the vicinity of the said nose.

JOHN HAMILTON LARMUTH.